United States Patent
Aiura et al.

(10) Patent No.: US 7,834,601 B2
(45) Date of Patent: Nov. 16, 2010

(54) CIRCUIT AND METHOD FOR REDUCING OUTPUT NOISE OF REGULATOR

(75) Inventors: Masami Aiura, Sendai (JP); Kanji Egawa, Sendai (JP); Shintaroh Murakami, Yokohama (JP)

(73) Assignee: Freescale Semiconductor, Inc., Austin, TX (US)

( * ) Notice: Subject to any disclaimer, the term of this patent is extended or adjusted under 35 U.S.C. 154(b) by 630 days.

(21) Appl. No.: 11/937,959

(22) Filed: Nov. 9, 2007

(65) Prior Publication Data

US 2009/0121697 A1     May 14, 2009

(51) Int. Cl.
   G05F 1/40    (2006.01)
   H02M 7/10    (2006.01)

(52) U.S. Cl. .................. 323/266; 323/288; 323/901; 363/49

(58) Field of Classification Search ........... 323/266, 323/283, 284, 285, 901, 286; 363/49, 65
See application file for complete search history.

(56) References Cited

U.S. PATENT DOCUMENTS

| | | | |
|---|---|---|---|
| 6,469,478 B1 * | 10/2002 | Curtin | 323/266 |
| 7,215,108 B2 * | 5/2007 | Inn et al. | 323/285 |
| 7,764,053 B2 * | 7/2010 | Mehas et al. | 323/222 |

FOREIGN PATENT DOCUMENTS

| | | |
|---|---|---|
| JP | 2005130622 A | 5/2005 |
| JP | 2005198484 A | 7/2005 |

* cited by examiner

*Primary Examiner*—Jessica Han
(74) *Attorney, Agent, or Firm*—Charles Bergere

(57) ABSTRACT

A circuit and a method for reducing output noise when a pulse width modulation mode is started. A pulse width modulation circuit generates a first pulse signal having a duty cycle that is in accordance with an output voltage of a regulator circuit. A drive circuit generates the output voltage from an input voltage in response to the first pulse signal provided from the pulse width modulation circuit. A feed forward circuit controls the pulse width modulation circuit in a manner to generate the first pulse signal having a duty cycle that maintains the output voltage at a desired level before the pulse width modulation circuit provides the first pulse signal to the drive circuit.

19 Claims, 6 Drawing Sheets

CIRCUIT AND METHOD FOR REDUCING OUTPUT NOISE OF REGULATOR

BACKGROUND OF THE INVENTION

The present invention relates to a regulator circuit for generating power supply voltage, and more particularly, to a circuit and method for reducing output noise generated when a pulse width modulation (PWM) mode is started.

In the prior art, DDC circuits (DC-DC converters) are known as regulator circuits. A DDC circuit typically includes either a PWM circuit or a pulse frequency modulation (PFM) circuit or includes both PWM and PFM circuits. The PWM circuit adjusts the pulse width of a pulse signal for driving an output transistor in accordance with an output voltage to maintain a constant power supply voltage, which is be supplied to a load. The PFM circuit selectively generates a pulse signal in accordance with the output voltage and adjusts the frequency of the pulse signal. Other examples of regulator circuits include linear regulators that linearly control an output voltage, such as low dropout (LDO) circuits. For example, Japanese Laid-Open Patent Publication Nos. 2005-198484 and 2005-130622 describe regulator circuits that include both linear regulators and switching regulators (DDC circuits).

FIG. 1 is a schematic block circuit diagram of a conventional regulator circuit (DDC circuit) 100 that includes a PWM circuit 102 and a PFM circuit 104.

The PWM circuit 102 includes an error amplifier 112 for generating a control voltage $V_{ER}$ in accordance with the difference between an output voltage VO and a reference voltage $V_{REF1}$. The error amplifier 112 is connected to a PWM generator 114. The PWM generator 114 compares a control voltage $V_{ER}$ with a reference pulse wave (not shown) and generates a pulse signal $S_{PWM}$ having a variable duty cycle.

The PFM circuit 104 includes a comparator 116. The comparator 116 compares an output voltage VO with a reference pulse wave $V_{REF2}$ and generates a comparison signal $V_{COMP}$. The comparator 116 is connected to a PFM generator 118. The PFM generator 118 selectively generates a pulse signal $S_{PFM}$ having a substantially constant duty cycle in accordance with the level of the comparison signal $V_{COMP}$, which is provided from the comparator 116.

The PWM circuit 102 and the PFM circuit 104 are connected to a multiplexer 120. The multiplexer 120 selects one of the pulse signal $S_{PWM}$ and the pulse signal $S_{PFM}$ as a drive pulse signal $S_{DRV}$ in response to a mode selection signal S1. A pre-driver 122 generates drive signals $V_H$ and $V_L$ for driving output transistors T1 and T2 in a complementary manner based on the drive pulse signal $S_{DRV}$.

A first terminal of a coil L1 is connected to a node N1 between the output transistors T1 and T2. A capacitor C1 is connected between a second terminal of the coil L1 and ground. The capacitor C1 smoothes the output voltage VO generated at the second terminal of the coil L1.

When the output transistor T1 is activated and the output transistor T2 is deactivated, current corresponding to an input voltage VIN flows from the node N1 to the coil L1. This charges the coil L1 with energy (current). When the output transistor T1 is deactivated and the output transistor T2 is activated, the energy accumulated in the coil L1 is discharged via a loop formed by the output transistor T2, the coil L1, and the capacitor C1. Accordingly, the coil L1 accumulates energy, the amount of which corresponds to the duty cycle of the drive signal $V_H$ (or the drive signal $V_L$). The output voltage VO is controlled in accordance with the amount of accumulated energy.

FIG. 2 is a schematic waveform chart showing a mode switching operation of the regulator circuit 100 of FIG. 1.

When the regulator circuit 100 is operating in a PFM mode, only the PFM circuit 104 is activated. In this mode, the multiplexer 120 selects the pulse signal $S_{PFM}$ as the drive signal $S_{DRV}$. As a result, the transistors T1 and T2 are driven at a substantially constant duty cycle.

Subsequently, the PWM circuit 102 is activated (the PFM circuit 104 is deactivated) at timing t1. This switches the operation mode of the regulator circuit 100 from the PFM mode to the PWM mode. The multiplexer 120 selects the pulse signal $S_{PFM}$ as the drive signal $S_{DRV}$ in response to the mode selection signal S1.

The duty cycle of the pulse signal $S_{PWM}$ is not constant when the PWM circuit 102 starts operating. The error amplifier 112 of the PWM circuit 102 usually has an offset resulting from manufacturing variations. For example, the reference voltage $V_{REF1}$ of the error amplifier 112 may be lower than its originally intended target value. In this case, the PWM circuit 102 generates a pulse signal $S_{PWM}$ that lowers the output voltage VO. More specifically, the drive signals $V_H$ and $V_L$ drive the output transistors T1 and T2 so as to discharge the energy accumulated in the coil L1. This results in the output voltage VO including an unintended noise (voltage drop).

FIG. 3 is a schematic block circuit diagram of a conventional regulator circuit 200 that includes a DDC circuit 202 and an LDO circuit 204.

The DDC circuit 202 includes a PWM circuit 210, a pre-driver 212, and an output circuit 214 (transistors T1 and T2). The PWM circuit 210 includes an error amplifier 216 and a PWM generator 218. The error amplifier 216 and the PWM generator 218 start operating in response to an enable signal DDCEN. The PWM circuit 210 receives an output voltage VO1 (VO) via a feedback loop FB1 to control the duty cycle of a pulse signal $S_{PWM}$ in accordance with the level of the received output voltage VO1. The PWM circuit 210 shown in FIG. 3 operates in the same manner as the PWM circuit 102 shown in FIG. 1. Thus, the operation of the PWM circuit 210 will not be described in detail.

The LDO circuit 204 includes an output transistor T3, resistors 222 and 224, and an error amplifier 226. The error amplifier 226 starts operating in response to an enable signal LDOEN. The output transistor T3 receives a control signal $V_{LDO}$ from the error amplifier 226 and generates an output voltage VO2 (VO) from an input voltage VIN in response to the received controlled voltage $V_{LDO}$. The output voltage VO2 is supplied from a feedback loop FB2 to the error amplifier 226 as a feedback via a node N2 between the resistors 222 and 224. The error amplifier 226 compares a reference voltage $V_{REF}$ with the feedback voltage of the output voltage VO2. Based on the comparison result, the error amplifier 226 generates the control voltage $V_{LDO}$ to compensate for fluctuations in the output voltage VO2.

The regulator circuit 200 selectively operates the DDC circuit 202 (or the PWM circuit 210) and the LDO circuit 204 in accordance with the enable signals DDCEN and LDOEN and generates the output voltage VO in either the PWM mode or the LDO mode.

FIG. 4 is a schematic waveform chart showing a mode switching operation of the regulator circuit 200 of FIG. 3.

When the LDO circuit 204 is activated in the LDO mode based on a high (H) level enable signal LDOEN, the PWM circuit 210 is deactivated based on a low (L) level enable signal DDCEN. In this case, the regulator circuit 200 outputs the output voltage VO2 that is generated by the LDO circuit 204 as the output voltage VO.

Subsequently, the PWM circuit 210 starts operating in response to an H level enable signal DDCEN at timing t1. This switches the operation mode of the regulator circuit 200 from the LDO mode to the PWM mode.

When the PWM circuit 210 begins operating, the coil L1, which is connected to the node N1 of the DDC circuit 202, has not been charged with current energy. Further, the error amplifier 216 of the PWM circuit 102 has an offset in the same manner as the error amplifier shown in FIG. 1. Thus, the duty cycle of the pulse signal $S_{PWM}$ is lower than its expected value (the duty increases gradually from zero). As a result, the energy stored in the coil L1 and the offset of the error amplifier 216 may cause the output voltage VO to include unintended noise (voltage drop).

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
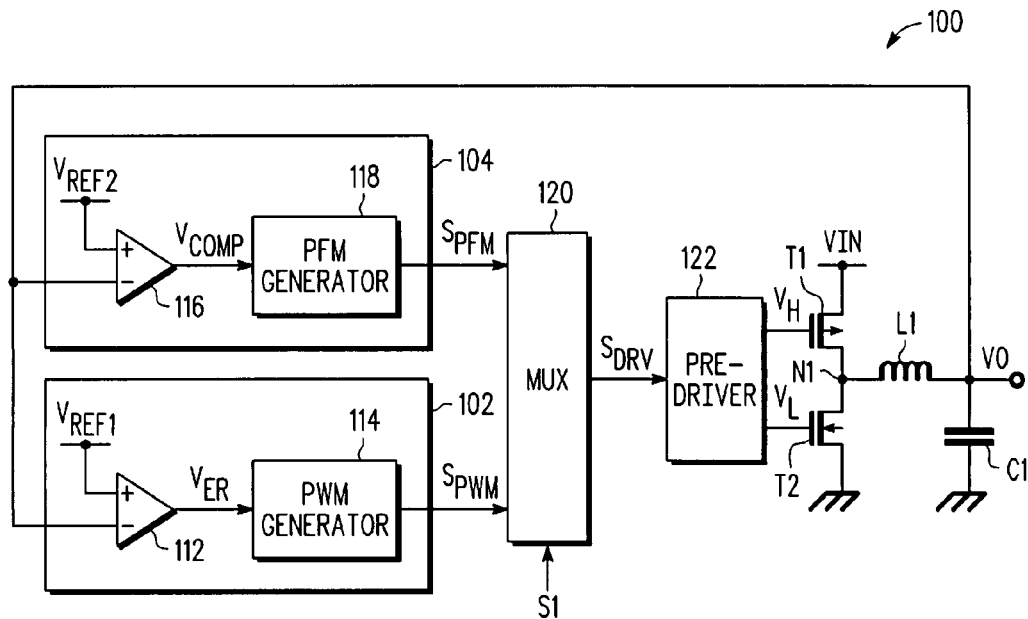
FIG. 1 is a schematic block circuit diagram of a conventional regulator circuit (DDC circuit) that includes a PWM circuit and a PFM circuit.
Figure 2:
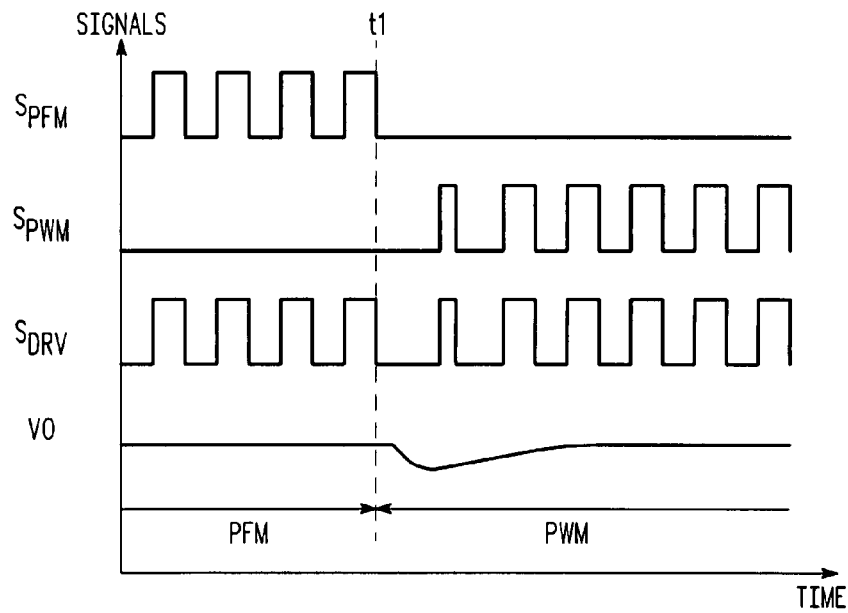
FIG. 2 is a schematic waveform chart showing a drive sequence of the regulator circuit of FIG. 1 when the operation mode switches from a PFM mode to a PWM mode.
Figure 3:
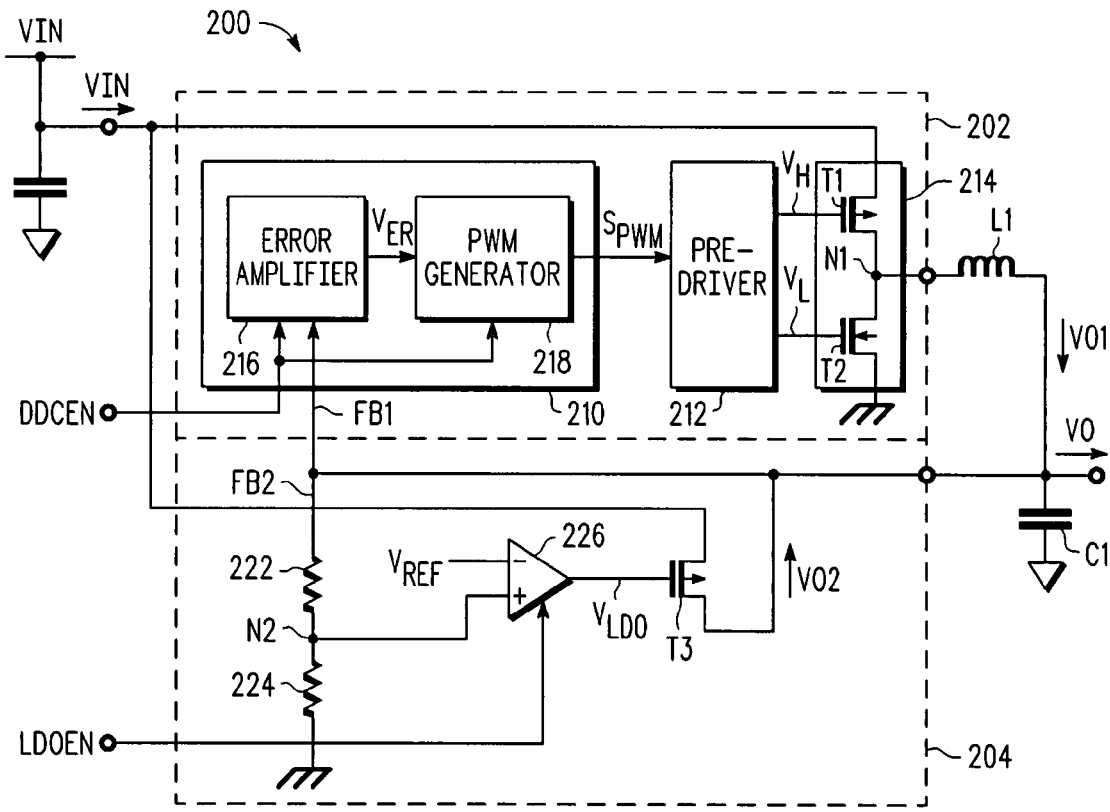
FIG. 3 is a schematic block circuit diagram of a conventional regulator circuit that includes a DDC circuit (PWM circuit) and an LDO circuit.
Figure 4:
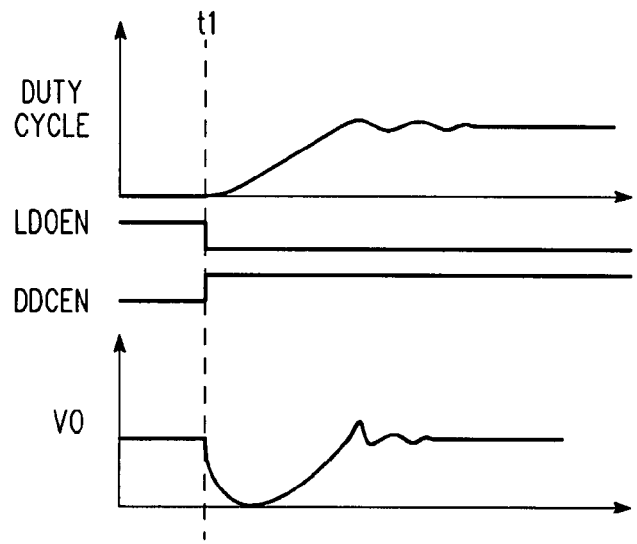
FIG. 4 is a schematic waveform chart showing a drive sequence of the regulator circuit of FIG. 3 when the operation mode switches from an LDO mode to a PWM mode.

In the drawings, like numerals are used for like elements throughout. The present invention provides a circuit and a method for reducing output noise generated when a PWM mode is started.

One aspect of the present invention is a regulator circuit for generating an output voltage from an input voltage. The regulator circuit includes a pulse width modulation circuit for generating a first pulse signal having a duty cycle that is in accordance with the output voltage. A drive circuit generates the output voltage from the input voltage in response to the first pulse signal provided from the pulse width modulation circuit. A feed forward circuit controls the pulse width modulation circuit to generate the first pulse signal having a duty cycle that maintains the output voltage at a desired level before the pulse width modulation circuit provides the first pulse signal to the drive circuit.

Another aspect of the present invention is a method for driving a regulator circuit that generates an output voltage from an input voltage. The regulator circuit includes a pulse width modulation circuit for controlling the output voltage with a first pulse signal, a pulse frequency modulation circuit for controlling the output voltage with a second pulse signal, and a feed forward circuit for controlling a duty cycle of the first pulse signal. The method includes activating the pulse frequency modulation circuit, controlling the output voltage with the second pulse signal, activating the feed forward circuit and the pulse width modulation circuit when the pulse frequency modulation circuit is operating, generating the first pulse signal with at least the feed forward circuit until operation of the pulse width modulation circuit is stabilized, and deactivating the pulse frequency modulation circuit after the operation of the pulse width modulation circuit is stabilized.

A further aspect of the present invention is a method for driving a regulator circuit that generates an output voltage from an input voltage. The regulator circuit includes a low dropout circuit for linearly controlling the output voltage, a pulse width modulation circuit for controlling the output voltage with a first pulse signal, and a feed forward circuit for controlling a duty cycle of the first pulse signal. The method includes activating the low dropout circuit, controlling the output voltage with the low dropout circuit, activating the feed forward circuit and the pulse width modulation circuit when the low dropout circuit is operating, generating the first pulse signal with at least the feed forward circuit until operation of the pulse width modulation circuit is stabilized, and deactivating the low dropout circuit after operation of the pulse width modulation circuit is stabilized.

Other aspects and advantages of the present invention will become apparent from the following description, taken in conjunction with the accompanying drawings, illustrating by way of example the principles of the invention.

A regulator circuit according to the present invention will now be described with reference to the drawings.

Figure 5:
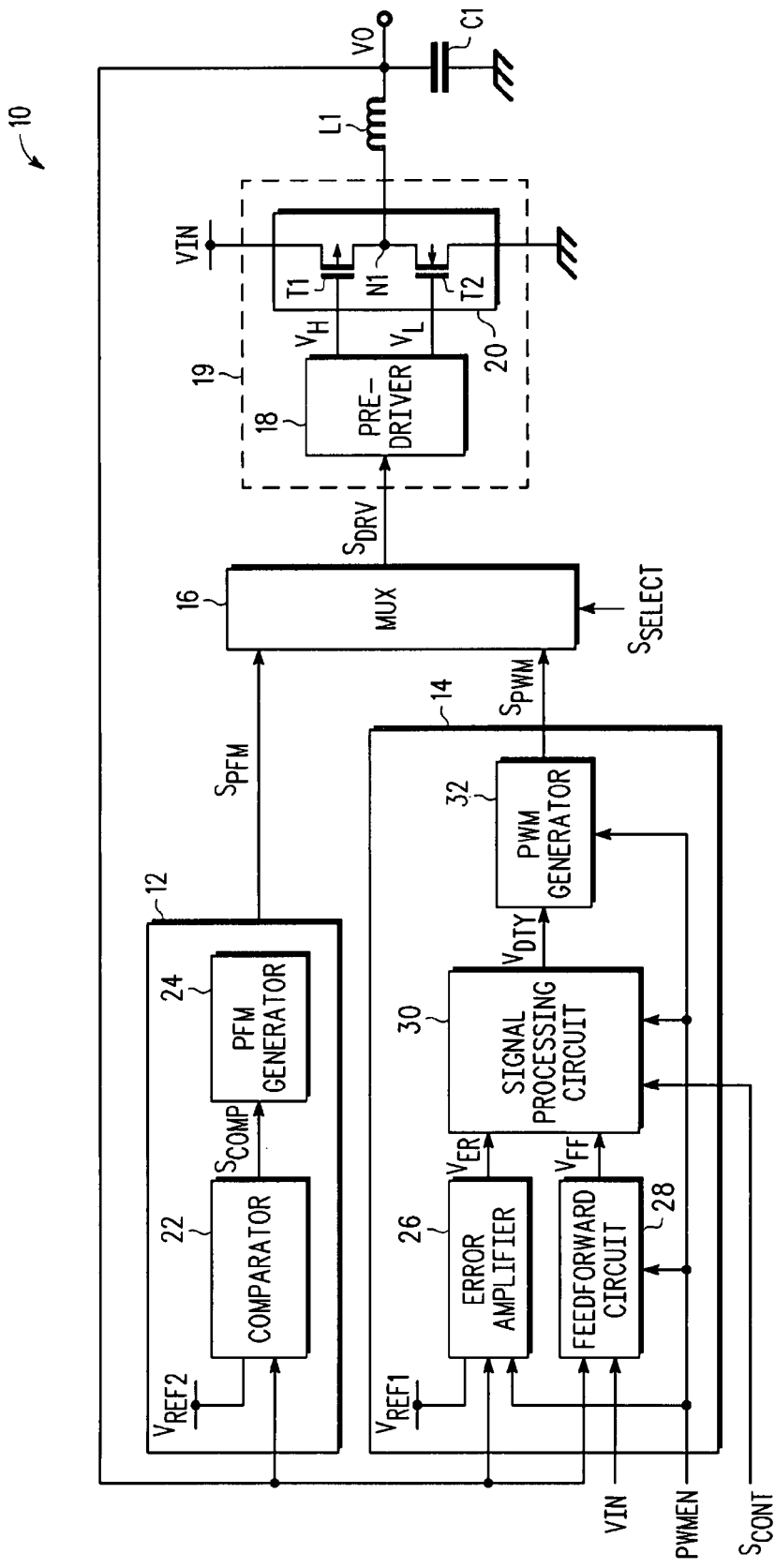
FIG. 5 is a schematic block circuit diagram of a regulator circuit (DDC circuit) that includes a PWM circuit and a PFM circuit according to a first embodiment of the present invention.

FIG. 5 is a schematic block circuit diagram of a regulator circuit 10 according to a first embodiment of the present invention. The regulator circuit 10 is a DDC circuit including a PFM circuit 12, a PWM circuit 14, a multiplexer (MUX) 16, a pre-driver 18, and an output circuit 20. The output circuit 20 includes first and second transistors T1 and T2. In the first embodiment, the first transistor T1 is formed by a P-channel MOS (metal oxide semiconductor) transistor, and the second transistor T2 is formed by an N-channel MOS transistor. The pre-driver 18 and the output circuit 20 form a drive circuit 19. A coil (choke coil) L1 has a first terminal, which is connected to a node N1 between the first and second transistors T1 and T2, and a second terminal, which is connected to ground via a capacitor C1. The capacitor C1 is a smoothing capacitor for smoothing output voltage VO that is generated at the second terminal of the coil L1.

The PWM circuit 14 includes an error amplifier 26, a feed forward circuit (hereafter referred to as "FF circuit") 28, a signal processing circuit 30, and a PWM generator 32. The signal processing circuit 30 is connected to the error amplifier 26 and the FF circuit 28. The PWM generator 32 is connected to the signal processing circuit 30. The signal processing circuit 30 and the PWM generator 32 are activated in response to an enable signal PWMEN. The PWM circuit 14 compares the output voltage VO with a first reference voltage $V_{REF1}$ to generate a first pulse signal $S_{PWM}$ having a duty cycle determined in accordance with the comparison result. The structure of the PWM circuit 14 will now be described in detail.

The error amplifier 26 is supplied with the output voltage VO and the first reference voltage $V_{REF1}$. The first reference voltage $V_{REF1}$ corresponds to a target value of the output voltage VO. The error amplifier 26 amplifies the voltage difference between the output voltage VO and the first reference voltage $V_{REF1}$ to generate a control voltage $V_{ER}$ for adjusting the duty cycle of the first pulse signal $S_{PWM}$. More specifically, when the output voltage VO is lower than the first reference voltage $V_{REF1}$, the error amplifier 26 increases the control voltage $V_{ER}$ in accordance with the voltage difference between the output voltage VO and the first reference voltage $V_{REF1}$. When the output voltage VO is higher than the first reference voltage $V_{REF1}$, the error amplifier 26 decreases the control voltage $V_{ER}$ in accordance with the voltage difference between the output voltage VO and the first reference voltage $V_{REF1}$. Accordingly, the error amplifier 26 generates the control voltage $V_{ER}$ so that the output voltage VO becomes equal to the first reference voltage $V_{REF1}$.

The FF circuit 28 controls the PWM circuit 14 to generate the first pulse signal $S_{PWM}$, which has a duty cycle that maintains the output voltage VO at a predetermined level (or the target value), before the PWM circuit 14 provides the first pulse signal $S_{PWM}$ to the drive circuit 19. The FF circuit 28 adjusts the duty cycle of the first pulse signal $S_{PWM}$, which is generated by the PWM circuit 14, in a manner independent from the control voltage $V_{ER}$, which is generated by the error amplifier 26. More specifically, the FF circuit 28 generates a feed forward voltage $V_{FF}$ for adjusting the duty cycle of the first pulse signal $S_{PWM}$ using the output voltage VO and input voltage VIN. The first reference voltage $V_{REF1}$ corresponding to the target value of the output voltage VO may be used instead of the output voltage VO.

The principle of the FF circuit 28 will now be described briefly.

When the regulator circuit 10 is controlled based on a duty cycle (duty ratio) DTY of the PWM circuit 14, the output voltage VO is approximated by equation (1), which is shown below.

$$VO=VIN*DTY \qquad (1)$$

Thus, the duty cycle DTY is calculated using equation (2), which is shown below.

$$DTY=VO/VIN \qquad (2)$$

Accordingly, the FF circuit 28 is formed by a divider that calculates the duty cycle DTY using equation (2). The divider (FF circuit 28) divides the output voltage VO by the input voltage VIN and generates the quotient (i.e., duty cycle DTY) as the feed forward voltage $V_{FF}$. The divider may have any structure.

The signal processing circuit 30 is supplied with the control voltage $V_{ER}$ from the error amplifier 26 and the feed forward voltage $V_{FF}$ from the FF circuit 28 and provided with a control signal $S_{CONT}$. The signal processing circuit 30 synthesizes the control voltage $V_{ER}$ and the feed forward voltage $V_{FF}$ at a predetermined ratio (for example 1:1) in response to the control signal $S_{CONT}$ to generate a duty control voltage $V_{DTY}$. The feed forward voltage $V_{FF}$ and the control voltage $V_{ER}$ may be synthesized at any ratio. The voltages $V_{FF}$ and $V_{ER}$ may be weighted with a predetermined coefficient before being synthesized with each other. The control signal $S_{CONT}$ is asserted simultaneously as the enable signal PWMEN. In the first embodiment, the enable signal PWMEN may be used as the control signal $S_{CONT}$.

The duty control voltage $V_{DTY}$ is supplied to the PWM generator 32. The PWM generator 32 compares the duty control signal $V_{DTY}$ with a reference pulse wave (not shown in FIG. 5) to generate the first pulse signal $S_{PWM}$.

The PFM circuit 12 will now be described. The PFM circuit 12 includes a comparator 22 and a PFM generator 24, which is connected to the comparator 22. The comparator 22 and the PFM generator 24 are activated based on an enable signal, which is not shown. The PFM circuit 12 has the same structure as the PFM circuit 104 shown in FIG. 1.

The comparator 22 compares the output voltage VO with a second reference voltage $V_{REF2}$ and generates a comparison signal $S_{COMP}$. The PFM generator 24 selectively generates a second pulse signal $S_{PFM}$ having a substantially constant duty cycle that is determined in accordance with the level of the comparison signal $S_{COMP}$, which is provided from the comparator 22. For example, the PFM generator 24 generates the second pulse signal $S_{PFM}$ only when the output voltage VO is lower than the second reference voltage $V_{REF2}$.

The multiplexer 16 is provided with the first pulse signal $S_{PWM}$, the second pulse signal $S_{PFM}$, and a mode selection signal $S_{SELECT}$. In response to the mode selection signal $S_{SELECT}$, the multiplexer 16 selects one of the first and second pulse signals $S_{PWM}$ and $S_{PFM}$ as a drive pulse signal $S_{DRV}$. More specifically, the mode selection signal $S_{SELECT}$ is set at a first level in the PWM mode. The multiplexer 16 selects the first pulse signal $S_{PWM}$ in response to the mode selection signal $S_{SELECT}$ with the first level. The mode selection signal $S_{SELECT}$ is set at a second level in the PFM mode. The multiplexer 16 selects the second pulse signal $S_{PFM}$ in response to the mode selection signal $S_{SELECT}$ with the second level.

The mode selection signal $S_{SELECT}$ shifts from the second level to the first level based on the enable signal PWMEN. In the first embodiment, the mode selection signal $S_{SELECT}$ shifts from the second level to the first level when a predetermined time elapses after assertion of the enable signal PWMEN. Thus, the operation mode switches from the PFM mode to the PWM mode when the predetermined time elapses after the PWM circuit 14 is activated. The operation mode switches from the PFM mode to the PWM mode when the duty cycle of the first pulse signal $S_{PWM}$ is stabilized. In other words, the PWM mode is started only after the duty cycle of the first pulse signal $S_{PWM}$ is stabilized. This prevents an unstable drive pulse signal $S_{DRV}$ from being generated when the PWM mode is started.

The drive pulse signal $S_{DRV}$, which is output from the multiplexer 16, is provided to the pre-driver 18 of the drive circuit 19. The pre-driver 18 generates the first and second drive signals $V_H$ and $V_L$ for driving the first and second transistors T1 and T2 in a complementary manner based on the drive pulse signal $S_{DRV}$. The first drive signal $V_H$ is provided to the gate of the first transistor (PMOS transistor) T1. The second drive signal $V_L$ is provided to the gate of the second transistor T2 (NMOS transistor). The source of the first transistor T1 is connected to the input voltage VIN, and the drain of the first transistor T1 is connected to the drain of the second transistor T2. The source of the second transistor T2 is connected to ground.

When the first transistor T1 is activated and the second transistor T2 is deactivated, the current corresponding to the input voltage VIN flows from the node N1 between the transistors T1 and T2 through the coil L1. This charges the coil L1 with energy (current). When the first transistor T1 is deactivated and the second transistor T2 is activated, the energy accumulated in the coil L1 is discharged via a loop formed by the second transistor T2, the coil L1, and the capacitor C1. Accordingly, the coil L1 accumulates energy, the amount of which corresponds to the duty cycle of the drive signal $V_H$ (or the drive signal $V_L$). The output voltage VO is changed in accordance with the amount of accumulated energy.

Figure 7:
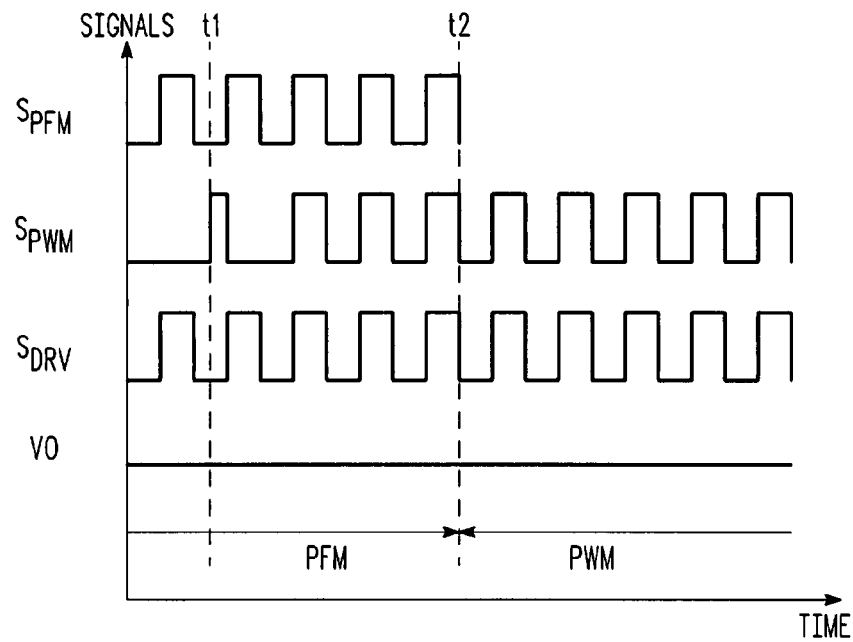
FIG. 7 is a schematic waveform chart showing a drive sequence of the regulator circuit of FIG. 5 when the operation mode switches from a PFM mode to a PWM mode.

FIG. 7 is a schematic waveform chart showing a drive sequence of the regulator circuit 10 of FIG. 5 when the operation mode switches from the PFM mode to the PWM mode.

The regulator circuit 10 operates in the PFM mode before timing t1. In this mode, only the PFM circuit 12 is activated, and the multiplexer 16 selects the second pulse signal $S_{PFM}$ as the drive pulse $S_{DRV}$. As a result, the first and second transistors T1 and T2 are driven at a substantially constant duty cycle.

Subsequently, the PWM circuit 14 is activated based on the enable signal PWMEN at timing t1. The PWM circuit 14 starts operating and generates the first pulse signal $S_{PWM}$ with the control voltage $V_{ER}$, which is generated by the error amplifier 26, and the feed forward voltage $V_{FF}$, which is generated by the FF circuit 28. In this state, the mode selection signal $S_{SELECT}$ is maintained at the second level, which corresponds to the PFM mode. More specifically, the drive pulse signal $S_{DRV}$, which is output from the multiplexer 16, is maintained as the second pulse signal $S_{PFM}$. The regulator circuit 10 continues operating in the PFM mode.

The mode selection signal $S_{SELECT}$ shifts from the second level to the first level at timing t2. The multiplexer 16 selects the first pulse signal $S_{PWM}$ as the drive pulse signal $S_{DRV}$ in response to the mode selection signal $S_{SELECT}$, which has the first level. This switches the operation mode of the regulator circuit 10 from the PFM mode to the PWM mode.

As described above, the operation mode switches from the PFM mode to the PWM mode when the duty cycle of the first pulse signal $S_{PWM}$ is stabilized. As a result, when the PWM mode is started (timing t2), the first and second transistors T1 and T2 are driven based on the stabilized first pulse signal $S_{PWM}$. This prevents the output voltage VO from including unintended noise (voltage drop).

Figure 6:
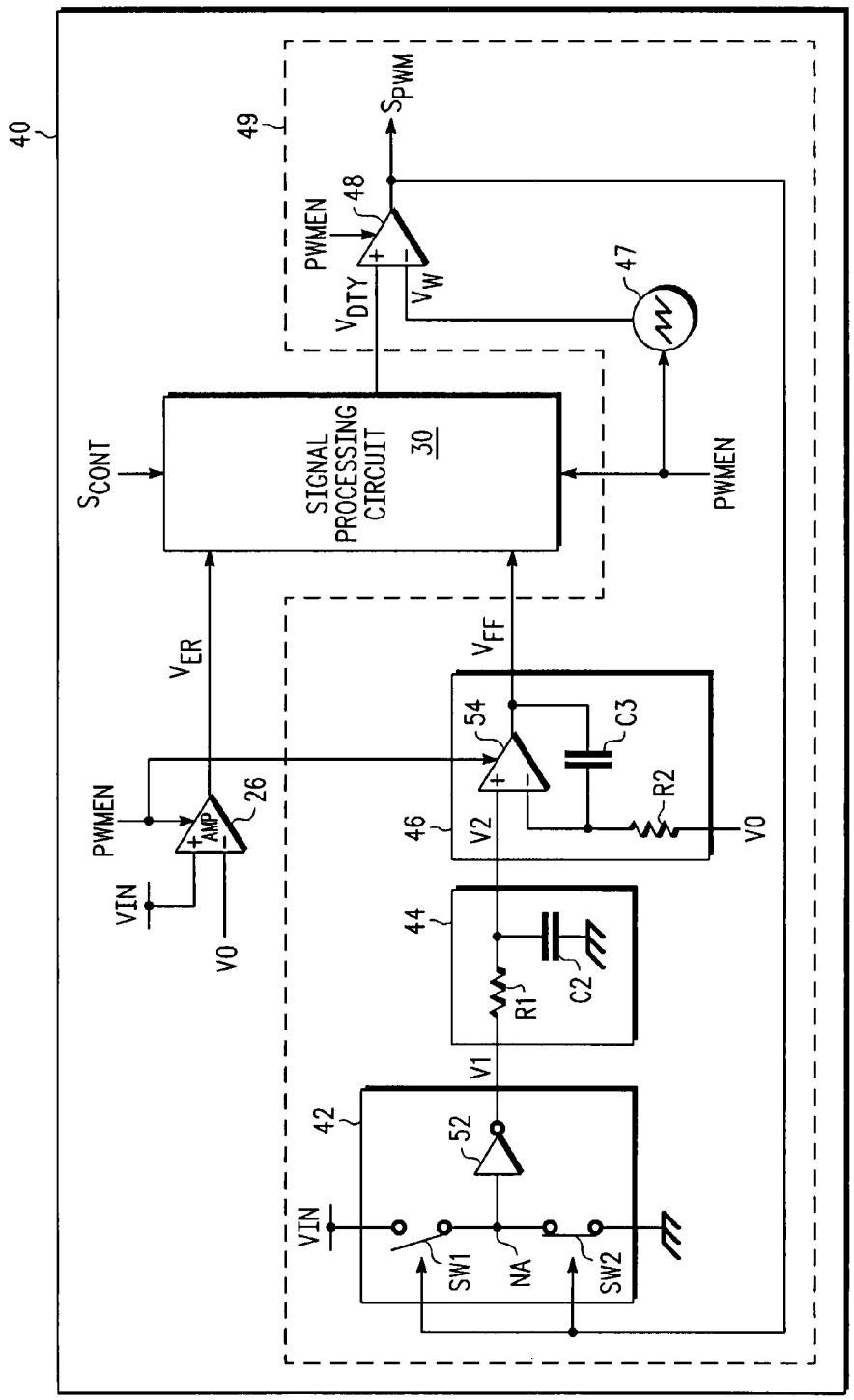
FIG. 6 is a schematic block circuit diagram of another PWM circuit (another feed forward circuit) according to the present invention.

FIG. 6 is a schematic block circuit diagram of another PWM circuit 40 according to the present invention. The PWM circuit 40 may be used in lieu of the PWM circuit 14 in the regulator circuit 10 shown in FIG. 5.

The PWM circuit 40 includes an error amplifier 26, a signal processing circuit 30, a switch circuit 42, a filter circuit 44, an integration circuit 46, an oscillation circuit 47, and a comparison circuit 48. The oscillation circuit 47 and the comparison circuit 48 form a PWM generator. Further, the switch circuit 42, the filter circuit 44, the integration circuit 46, the oscillation circuit 47, and the comparison circuit 48 form a feed forward circuit (FF circuit) 49. The error amplifier 26, the signal processing circuit 30, the oscillation circuit 47, and the comparison circuit 48 are activated based on an enable signal PWMEN.

The oscillation circuit 47 generates a sawtooth reference pulse wave $V_W$ and provides an inversion input terminal of the comparison circuit 48 with the reference pulse signal $V_W$. A non-inversion input terminal of the comparison circuit 48 is supplied with the duty control voltage $V_{DTY}$, which is generated by the signal processing circuit 30. The comparison circuit 48 compares the duty control signal $V_{DTY}$ with the reference pulse wave $V_W$ and changes the duty cycle of the first pulse signal $S_{PWM}$ in accordance with the comparison result. As a result, when the duty control voltage $V_{DTY}$ fluctuates, the duty cycle of the first pulse signal $S_{PWM}$ changes accordingly.

The switch circuit 42 includes switch elements SW1 and SW2 and an inversion circuit 52. The switch elements SW1 and SW2 are connected to the comparison circuit 48. The inversion circuit 52 is connected to a node NA between the switch elements SW1 and SW2. The switch elements SW1 and SW2 are driven in a complementary manner based on the first pulse signal $S_{PWM}$. For example, the switch element SW1 may be formed by a P-channel MOS transistor, and the switch element SW2 may be formed by an N-channel MOS transistor. The inversion circuit 52 generates an inverted signal that is obtained by inverting a signal output at the node NA based on the input voltage VIN. The switch circuit 42 generates a control pulse signal V1 having the same polarity (the same pulse width) as the first pulse signal $S_{PWM}$. The switch circuit 42 is not limited to the structure shown in FIG. 6 and may have any structure. For example, the switch circuit 42 may generate a pulse signal of which polarity is opposite to the polarity of the first pulse signal $S_{PWM}$.

The filter circuit 44 is a low-pass filter that includes a resistor R1 and a capacitor C2. The filter circuit 44 eliminates high-frequency elements from the control pulse signal V1, which is provided from the switch circuit 42, and generates an adjustment voltage V2, which is substantially a DC voltage. The adjustment voltage V2 is approximated by VIN*DTY (i.e., right-hand side of equation (1)), in which the duty cycle of the first pulse signal $S_{PWM}$ is represented by DTY.

The integration circuit 46 includes an amplifier 54, a resistor R2, and a capacitor C3. The resistor R2 is connected to an inversion input terminal of the amplifier 54. The capacitor C3 is connected between the inversion input terminal and output terminal of the amplifier 54. The inversion input terminal of the amplifier 54 is supplied with an output voltage VO of the regulator circuit 10 via the resistor R2. A target value of the output voltage VO may be used instead of the output voltage VO. A non-inversion input terminal of the amplifier 54 is supplied with an adjustment voltage $V2_1$ which is supplied from the filter circuit 44. The amplifier 54 compares the adjustment voltage V2 with the output voltage VO. The amplifier 54 amplifies the difference between the voltages V2 and VO in accordance with the comparison result and generates a feed forward voltage $V_{FF}$. The feed forward voltage $V_{FF}$ is supplied to the signal processing circuit 30. The signal processing circuit 30 then synthesizes the feed forward voltage $V_{FF}$ with the control voltage $V_{ER}$, which is generated by the feed forward voltage $V_{FF}$, to generate a duty control voltage $V_{DTY}$.

The FF circuit 49 generates the feed forward voltage $V_{FF}$ from the input voltage VIN and the output voltage VO in accordance with the first pulse signal $S_{PWM}$, which is provided as a feedback via a loop 50 that connects the comparison circuit 48 (pulse generator) and the switch circuit 42. In detail, the FF circuit 49 generates the feed forward voltage $V_{FF}$ in a manner that the adjustment voltage V2 (i.e., the right-hand side of equation (1), or "VIN* DTY") becomes equal to the output voltage VO (i.e., the left-hand side of equation (1)). As a result, the FF circuit 49 generates the feed forward voltage $V_{FF}$ more accurately than the FF circuit 28 (divider) shown in FIG. 5.

The FF circuit 49 does not necessarily have to use the duty control voltage $V_{DTY}$, which is supplied from the signal processing circuit 30. For example, the FF circuit 49 may include another PWM comparison circuit that has the same structure as the comparison circuit 48. In this case, the PWM comparison circuit receives the feed forward voltage $V_{FF}$ directly from the integration circuit 46, compares the feed forward voltage $V_{FF}$ with the reference pulse wave $V_W$, and generates the first pulse signal $S_{PWM}$. With this structure, the FF circuit 49 generates the feed forward voltage $V_{FF}$ in a manner independent from the control voltage $V_{ER}$, which is generated by the error amplifier 26. This quickly stabilizes the duty cycle of the first pulse signal $S_{PWM}$. Alternatively, the signal processing circuit 30 shown in FIG. 6 may select the feed forward voltage $V_{FF}$ as the duty control voltage $V_{DTY}$.

The regulator circuit 10 of the first embodiment has the advantages described below.

The PWM circuit 14 starts operating before the operation mode switches from the PFM mode to the PWM mode. The PWM circuit 14 generates the first pulse signal $S_{PWM}$ with the error amplifier 26 and the FF circuit 28 before the PWM mode is started. The PWM mode is then started after the duty cycle of the first pulse signal $S_{PWM}$ is stabilized. The drive circuit 19 is then driven based on the first pulse signal $S_{PWM}$. This prevents the output voltage VO from including unintended noise (voltage drop) that is generated when the PWM mode is started.

The PWM circuit 14 generates the first pulse signal $S_{PWM}$ with the error amplifier 26 and the FF circuit 28. This stabilizes the duty cycle of the first pulse signal $S_{PWM}$ more quickly than when the error amplifier 26 is used solely. As a result, the operation mode quickly switches from the PFM mode to the PWM.

Before the PFM mode is started, the PWM circuit 14 is driven when the PFM circuit 12 is still being driven. However, the drive circuit 19 is actually driven by the second pulse signal $S_{PFM}$ until the PWM mode is started. This prevents the first pulse signal $S_{PWM}$ from destabilizing the operation of the regulator circuit 10 in the PFM mode.

The FF circuit 28 generates the feed forward voltage $V_{FF}$ with the input voltage VIN and the output voltage VO (generated by the PFM circuit 12). Thus, the FF circuit 28 controls the duty cycle in a manner independent from the control voltage $V_{ER}$, which is generated by the error amplifier 26.

The PWM generator 32 generates the first pulse signal $S_{PWM}$ with the duty control voltage $V_{DTY}$, which is generated from the control voltage $V_{ER}$ and the feed forward voltage $V_{FF}$. This accurately control the duty cycle of the first pulse signal $S_{PWM}$ with the control voltage $V_{ER}$ and quickly stabilizes the feed forward voltage $V_{FF}$ in the PWM mode.

The FF circuit 49 in FIG. 6 feedback controls the feed forward voltage $V_{FF}$ with the first pulse signal $S_{PWM}$. The FF circuit 49 generates the feed forward voltage $V_{FF}$ more accurately than the FF circuit 28 (FIG. 5).

Figure 8:
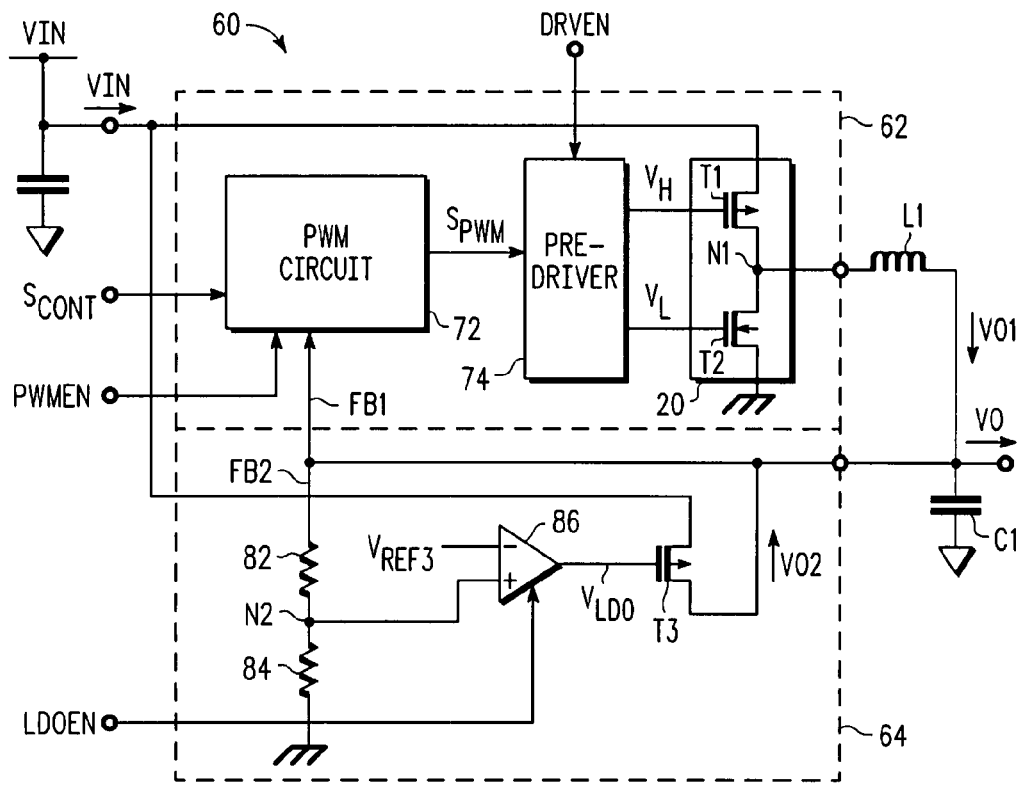
FIG. 8 is a schematic block circuit diagram of a regulator circuit that includes a DDC circuit and an LDO circuit according to a second embodiment of the present invention.

FIG. 8 is a schematic block circuit diagram of a regulator circuit 60 according to a second embodiment of the present invention.

The regulator circuit 60 of the second embodiment includes a DDC circuit 62 and an LDO circuit 64. The DDC circuit 62 includes a PWM circuit 72, a pre-driver 74, and an output circuit 20. The PWM circuit 72 is formed by either the PWM circuit 14 in FIG. 5 or the PWM circuit 40 in FIG. 6. The pre-driver 74 and the output circuit 20 form a drive circuit of the present invention. The drive circuit operates in the same manner as the drive circuit 19 of FIG. 5.

In the PWM mode, the PWM circuit 72 receives an output voltage VO1 (VO) via a feedback loop FB1 and controls the duty cycle of a first pulse signal $S_{PWM}$ in accordance with the level of the received output voltage VO1. The pre-driver 74 generates drive signals $V_H$ and $V_L$ based on the first pulse signal $S_{PWM}$. Transistors T1 and T2 are driven in a complementary manner based on the drive signals $V_H$ and $V_L$. As a result, a coil L1 accumulates current energy (current) based on the driving of the transistors T1 and T2. The output voltage VO1 is controlled in accordance with the amount of accumulated energy.

In the second embodiment, the PWM circuit 72 is activated based on an enable signal PWMEN. The pre-driver 74 is activated based on an enable signal DRVEN. The enable signal DRVEN is associated with the enable signal PWMEN. More specifically, the enable signal DRVEN is asserted when a predetermined time elapses after the enable signal PWMEN is asserted. Thus, the pre-driver 74 is activated when the predetermined time elapses after the PWM circuit 72 is activated. The pre-driver 74 is activated when the duty cycle of the first pulse signal $S_{PWM}$, which is generated by the PWM circuit 72, stabilizes. Thus, the PWM mode is started only after the duty cycle of the first pulse signal $S_{PWM}$ is stabilized. This prevents unstable drive signals $V_H$ and $V_L$ from being generated when the PWM mode is started.

The LDO circuit 64 includes a transistor T3, resistors 82 and 84, and an error amplifier 86. The error amplifier 86 starts operating in response to an enable signal LDOEN. The transistor T3 receives a control signal $V_{LDO}$ from the error amplifier 86 and generates an output voltage VO2 (VO) from an input voltage VIN in response to the received control voltage $V_{LDO}$. The output voltage VO2 is supplied as a feedback from the feedback loop FB2 to the error amplifier 86 via a node N2 between the resistors 82 and 84. The error amplifier 86 compares a reference voltage $V_{REF3}$ with a feedback voltage of the output voltage VO2 to generate a control voltage $V_{LDO}$, which compensates for fluctuations in the output voltage VO2 based on the comparison result.

The regulator circuit 60 selectively operates the DDC circuit 62 (i.e., the PWM circuit 72) and the LDO circuit 64 in accordance with the enable signals PWMEN and LDOEN to generate the output voltage VO in either the PWM mode or the LDO mode.

Figure 9A:
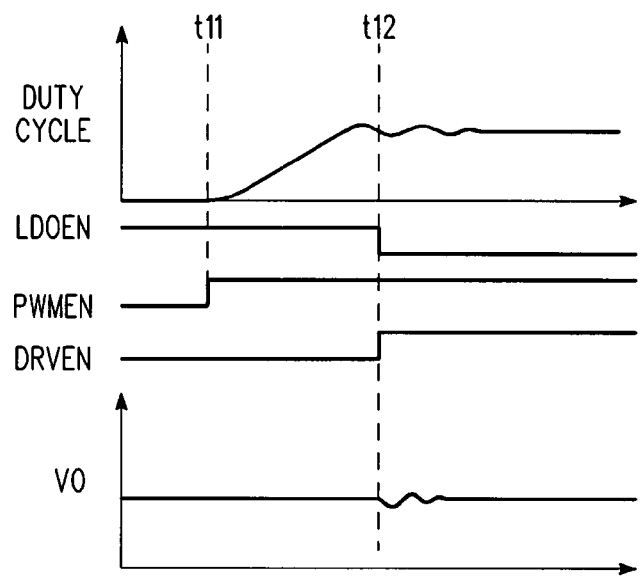
FIG. 9A is a schematic waveform chart showing a drive sequence of the regulator circuit of FIG. 8 when the duty cycle is controlled with an error amplifier and a feed forward circuit before the PWM mode is started.

FIG. 9A is a schematic waveform chart showing a switching operation of the regulator circuit 60 shown in FIG. 8 from the LDO mode to the PWM mode.

When the LDO circuit 64 is activated based on an H level enable signal LDOEN in the LDO mode, the PWM circuit 72 is deactivated based on an L level enable signal PWMEN. Thus, the regulator circuit 60 outputs the output voltage VO2, which is generated by the LDO circuit 64, as the output voltage VO.

Subsequently, the enable signal PWMEN shifts to an H level at timing t11. The PWM circuit 72 starts operating in response to the H level enable signal PWMEN and generates a first pulse signal $S_{PWM}$ based on the control signal $V_{ER}$, which is generated by the error amplifier 26, and the feed forward voltage $V_{FF}$, which is generated by the FF circuit 28 (or the FF circuit 49). As a result, the duty cycle of the first pulse signal $S_{PWM}$ increases gradually as the PWM circuit 72 operates. In this case, the enable signal DRVEN is maintained at an L level (the pre-driver 74 is maintained to be deactivated). Thus, the regulator circuit 60 continues operating in the LDO mode.

At timing t12, the enable signal LDOEN shifts to an L level and the enable signal DRVEN shifts to an H level. This deactivates the LDO circuit 64 and activates the pre-driver 74 of the DDC circuit 62. The enable signal PWMEN is maintained at an H level. Thus, the PWM circuit 72 continues operating. As a result, the operation mode of the regulator circuit 60 switches from the LDO mode to the PWM mode.

As described above, the pre-driver 74 is activated (or the operation mode switches from the LDO mode to the PWM mode) when the duty cycle of the first pulse signal $S_{PWM}$ is stabilized. When the PWM mode is started (at timing t12), the first and second transistors T1 and T2 are driven based on the stabilized first pulse signal $S_{PWM}$. This significantly reduces output noise (voltage drop) when the LDO mode is switched to the PWM mode.

The regulator circuit 60 of the second embodiment has the advantages described below.

The PWM circuit 72 starts operating before the operation mode switches from the LDO mode to the PWM mode. The PWM circuit 72 generates the first pulse signal $S_{PWM}$ with the error amplifier 26 and the FF circuit 28 (FF circuit 49) before the PWM mode is started. The PWM mode is started based on the enable signal DRVEN after the duty cycle of the firs pulse signal $S_{PWM}$ is stabilized. The drive circuit (the pre-driver 74 and the output circuit 20) is then driven based on the first pulse signal $S_{PWM}$. This significantly reduces output noise generated when the LDO mode is switched to the PWM mode.

The PWM circuit 72 generates the first pulse signal $S_{PWM}$ with the error amplifier 26 and the FF circuit 28 (or the FF circuit 49). This stabilizes the duty cycle of the first pulse signal $S_{PWM}$ more quickly than when the error amplifier 26 is used solely. Accordingly, the operation mode is quickly switched from the LDO mode to the PWM mode.

Before the PWM mode is started, the PWM circuit 72 is driven when the LDO circuit 64 is still being driven. However, the DDC circuit 62 does not operate (only the PWM circuit 72 operates) until the enable signal DRVEN activates the pre-driver 74. This prevents the first pulse signal $S_{PWM}$ from destabilizing the operation of the regulator circuit 60 in the LDO mode.

It should be apparent to those skilled in the art that the present invention may be embodied in many other specific forms without departing from the spirit or scope of the invention. Particularly, it should be understood that the present invention may be embodied in the following forms.

Figure 9B:
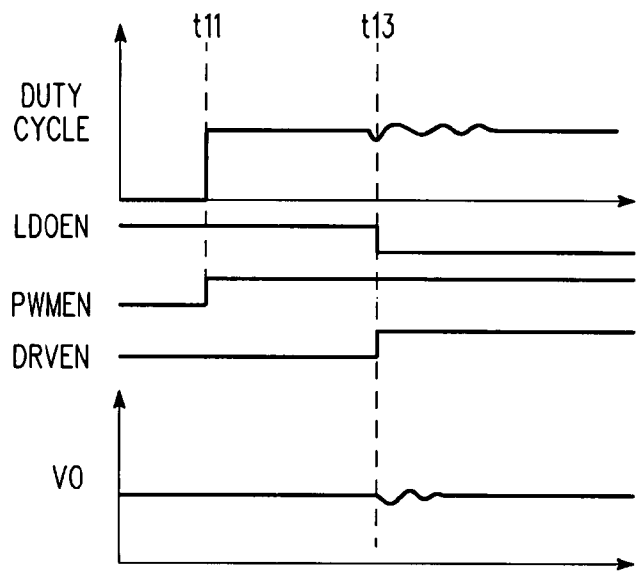
FIG. 9B is a schematic waveform chart showing a drive sequence of the regulator circuit of FIG. 8 when the duty cycle is controlled with only the feed forward circuit before the PWM mode is started.

The duty control executed by the PWM circuit 14 (FIG. 5) and the PWM circuit 40 (FIG. 6) may be changed as shown in FIG. 9B. FIG. 9B is a schematic waveform chart showing a drive sequence of the regulator circuit 60 of FIG. 8 when the duty cycle is controlled by only the FF circuit (28 or 49) before the PWM mode is started.

The regulator circuit 60 operates in the LDO mode before timing t11. At timing t11, the PWM circuit 72 starts operating in response to an H level enable signal PWMEN. In this state, the PWM circuit 72 generates a first pulse signal $S_{PWM}$ from only the feed forward voltage $V_{FF}$. More specifically, the signal processing circuit 30 selects the feed forward voltage $V_{FF}$ as the duty control voltage $V_{DTY}$ in response to the control signal $S_{CONT}$ having the first level (refer to FIG. 5 or FIG. 6). Subsequently, the pre-driver 74 is activated based on the enable signal DRVEN at timing t13, and the PWM mode is started. When a predetermined time elapses after the PWM mode is started, the PWM circuit 72 generates a first pulse signal $S_{PWM}$ with the error amplifier 26 and the FF circuit 28 or 49 (or generates a first pulse signal $S_{PWM}$ with only the error amplifier 26). More specifically, the signal processing circuit 30 selects a signal generated by synthesizing the control voltage $V_{ER}$ and the feed forward voltage $V_{FF}$ as the duty control voltage $V_{DTY}$ (or selects the control voltage $V_{ER}$ as the duty control voltage $V_{DTY}$) in response to the control signal $S_{CONT}$ having the second level. This generates the first pulse signal $S_{PWM}$ in a manner independent from the output of the error amplifier 26 before the PWM mode is started. Thus, the operation mode is switched more quickly from the LDO mode to the PWM mode (during t11 to t13) than the control in FIG. 9A.

The FF circuit 28 may be separate from the PWM circuit 14.

The FF circuit 49 may be separate from the PWM circuit 40.

The present invention is also applicable to a regulator circuit that operates in one of an LDO mode, a PFM mode, and a PWM mode.

The present examples and embodiments are to be considered as illustrative and not restrictive, and the invention is not to be limited to the details given herein, but may be modified within the scope and equivalence of the appended claims.

What is claimed is:

1. A regulator circuit for generating an output voltage from an input voltage, the regulator circuit comprising:
    a pulse width modulation circuit for generating a first pulse signal having a duty cycle that is in accordance with the output voltage;
    a drive circuit for generating the output voltage from the input voltage in response to the first pulse signal provided from the pulse width modulation circuit;
    a feed forward circuit for controlling the pulse width modulation circuit to generate the first pulse signal having a duty cycle that maintains the output voltage at a desired level before the pulse width modulation circuit provides the first pulse signal to the drive circuit; and
    a pulse frequency modulation circuit, connected to the drive circuit, for generating a second pulse signal having a substantially constant duty cycle that is in accordance with the output voltage, wherein the drive circuit generates the output voltage from the input voltage in response to one of the first pulse signal and the second pulse signal, and the pulse width modulation circuit generates the first pulse signal with the feed forward circuit when the pulse frequency modulation circuit is operating.

2. The regulator circuit according to claim 1, wherein the feed forward circuit is incorporated in the pulse width modulation circuit.

3. The regulator circuit according to claim 1, further comprising:
    a low dropout circuit for linearly controlling the output voltage, wherein the pulse width modulation circuit generates the first pulse signal with the feed forward circuit when the low dropout circuit is operating, and the drive circuit is activated when the low dropout circuit is deactivated.

4. The regulator circuit according to claim 1, wherein the feed forward circuit generates a feed forward voltage for adjusting the duty cycle of the first pulse signal using the input voltage, the output voltage, and the first pulse signal.

5. The regulator circuit according to claim 4, wherein the pulse width modulation circuit further includes:
    an error amplifier for comparing the output voltage with a first reference voltage and generating a control voltage for adjusting the duty cycle of the first pulse signal; and
    a pulse generator for generating the first pulse signal using at least one of the control voltage and the feed forward voltage.

6. The regulator circuit according to claim 5, wherein the feed forward circuit includes:
    the pulse generator;
    a switch circuit, connected to the pulse generator, for generating a control pulse signal having a pulse width that is the same as that of the first pulse signal using the input voltage and the first pulse signal;

a low-pass filter, connected to the switch circuit, for filtering the control pulse signal and generating an adjustment voltage; and an integration circuit for comparing the adjustment voltage and the output voltage and generating the feed forward voltage.

7. The regulator circuit according to claim 6, wherein the pulse width modulation circuit further includes:

a signal processing circuit connected to the error amplifier, the integration circuit, and the pulse generator, the signal processing circuit generating a duty control voltage using at least one of the control voltage and the feed forward voltage, and the pulse generator generating the first pulse signal in accordance with the duty control voltage.

8. The regulator circuit according to claim 1, wherein the feed forward circuit generates a feed forward voltage for adjusting the duty cycle of the first pulse signal using the input voltage and the output voltage.

9. The regulator circuit according to claim 8, wherein the feed forward circuit includes a divider for generating the feed forward voltage by dividing the output voltage by the input voltage.

10. The regulator circuit according to claim 8, wherein the pulse width modulation circuit further includes:

an error amplifier for comparing the output voltage with a first reference voltage and generating a control voltage for adjusting the duty cycle of the first pulse signal; and a pulse generator for generating the first pulse signal using at least one of the control voltage and the feed forward voltage.

11. The regulator circuit according to claim 10, wherein the pulse width modulation circuit further includes:

a signal processing circuit connected to the error amplifier, the feed forward circuit, and the pulse generator, in which the signal processing circuit generates a duty control using at least one of the control voltage and the feed forward voltage, and the pulse generator generates the first pulse signal in accordance with the duty control voltage.

12. The regulator circuit according to claim 10, wherein the pulse width modulation circuit simultaneously activates the error amplifier and the feed forward circuit.

13. The regulator circuit according to claim 1, wherein the feed forward circuit generates a feed forward voltage for adjusting the duty cycle of the first pulse signal using the input voltage and a target value of the output voltage.

14. A method for driving a regulator circuit that generates an output voltage from an input voltage, wherein the regulator circuit includes a pulse width modulation circuit for controlling the output voltage with a first pulse signal, a pulse frequency modulation circuit for controlling the output voltage with a second pulse signal, and a feed forward circuit for controlling a duty cycle of the first pulse signal, the method comprising:

activating the pulse frequency modulation circuit;

controlling the output voltage with the second pulse signal;

activating the feed forward circuit and the pulse width modulation circuit when the pulse frequency modulation circuit is operating;

generating the first pulse signal with at least the feed forward circuit until operation of the pulse width modulation circuit is stabilized; and deactivating the pulse frequency modulation circuit after the operation of the pulse width modulation circuit is stabilized.

15. The method according to claim 14, further comprising:

generating the first pulse signal with at least the pulse width modulation circuit after operation of the pulse width modulation circuit is stabilized.

16. The method according to claim 14, wherein said generating the first pulse signal includes generating the first pulse signal with the feed forward circuit using the input voltage and the output voltage.

17. A method for driving a regulator circuit that generates an output voltage from an input voltage, wherein the regulator circuit includes a low dropout circuit for linearly controlling the output voltage, a pulse width modulation circuit for controlling the output voltage with a first pulse signal, and a feed forward circuit for controlling a duty cycle of the first pulse signal, the method comprising:

activating the low dropout circuit;

controlling the output voltage with the low dropout circuit;

activating the feed forward circuit and the pulse width modulation circuit when the low dropout circuit is operating;

generating the first pulse signal with at least the feed forward circuit until operation of the pulse width modulation circuit is stabilized; and deactivating the low dropout circuit after operation of the pulse width modulation circuit is stabilized.

18. The method according to claim 17, further comprising:

generating the first pulse signal with at least the pulse width modulation circuit after operation of the pulse width modulation circuit is stabilized.

19. The method according to claim 17, wherein the regulator circuit further includes a drive circuit for generating the output voltage from the input voltage in response to the first pulse signal, the method further comprising:

activating the drive circuit after operation of the pulse width modulation circuit is stabilized.

* * * * *